US011115342B2

(12) United States Patent
Corrales Lopez et al.

(10) Patent No.: US 11,115,342 B2
(45) Date of Patent: Sep. 7, 2021

(54) USING BFD PACKETS IN A VIRTUALIZED DEVICE

(71) Applicant: Hewlett Packard Enterprise Development LP, Houston, TX (US)

(72) Inventors: David Corrales Lopez, Heredia (CR); Agustin Jose Meneses Fuentes, Heredia (CR); Vivek Ramamoorthy, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 133 days.

(21) Appl. No.: 16/385,046

(22) Filed: Apr. 16, 2019

(65) Prior Publication Data

US 2020/0336434 A1 Oct. 22, 2020

(51) Int. Cl.
*H04L 12/823* (2013.01)
*H04L 12/24* (2006.01)
*H04L 12/841* (2013.01)
*H04L 12/703* (2013.01)
*H04L 12/46* (2006.01)
*H04L 7/00* (2006.01)

(52) U.S. Cl.
CPC ............ *H04L 47/32* (2013.01); *H04L 7/0008* (2013.01); *H04L 12/4641* (2013.01); *H04L 41/0654* (2013.01); *H04L 45/28* (2013.01); *H04L 47/286* (2013.01)

(58) Field of Classification Search
CPC ............ H04L 12/4633; H04L 12/4641; H04L 41/0654; H04L 41/0668; H04L 41/0893; H04L 45/28; H04L 47/286; H04L 47/32; H04L 7/0008
See application file for complete search history.

(56) References Cited

U.S. PATENT DOCUMENTS 8,989,020 B2   3/2015   So
9,497,107 B1   11/2016   Akiya et al.
1,005,085 A1   8/2018   Licking et al.
(Continued)

OTHER PUBLICATIONS

Virtual Switching System (VSS) Best Practices, (Research Paper). Retrieved Jan. 11, 2019, 44 Pgs.
(Continued)

*Primary Examiner* — Kashif Siddiqui
(74) *Attorney, Agent, or Firm* — Hewlett Packard Enterprise Patent Department

(57) ABSTRACT

Examples disclosed herein relate to a method comprising receiving a bidirectional forwarding detection (BFD) packet originating from a first network device, wherein the first linked network device and a second linked network device are part of a link aggregation group running a BFD session. The method may include transmitting, from the first linked network device, a BFD synchronization packet to the second linked network device and receiving, at the second linked network device, the BFD synchronization packet, wherein a time-to-live (TTL) value of the BFD synchronization packet is lower than a BFD TTL supported by the BFD session. The method may also include determining that the BFD synchronization packet is a BFD single-hop packet coming from a VLANs using the active forwarding mode and determining not to discard the BFD synchronization packet.

20 Claims, 4 Drawing Sheets

(56) References Cited

U.S. PATENT DOCUMENTS

| | | | |
|---|---|---|---|
| 2007/0183419 A1* | 8/2007 | Kompella | H04L 45/00 370/389 |
| 2007/0189177 A1 | 8/2007 | Zhai | |
| 2013/0077472 A1* | 3/2013 | Tan | H04L 45/22 370/221 |
| 2015/0063364 A1* | 3/2015 | Thakkar | H04L 45/7453 370/401 |
| 2016/0197853 A1 | 7/2016 | Kumar et al. | |
| 2017/0005915 A1* | 1/2017 | Mirsky | H04L 69/40 |
| 2019/0306036 A1* | 10/2019 | Boutros | H04L 43/10 |
| 2021/0029024 A1* | 1/2021 | Lopez | H04L 12/4633 |

OTHER PUBLICATIONS

Welch-Abernathy, D., Check Point R80.20 Production and Public EA, (Web Page), Apr. 26, 2018, 14 Pgs.

* cited by examiner

USING BFD PACKETS IN A VIRTUALIZED DEVICE

BACKGROUND

Link aggregation (LAG) is point-to-point link between a pair of network devices. Traffic may get load balanced among interfaces of the LAG, in order to help increase the aggregate bandwidth and improve link failure recovery. Link aggregation may be used to create a virtual environment when a LAG is created between a pair of two network devices, such as network switch.

BRIEF DESCRIPTION OF THE DRAWINGS

Some implementations of the present disclosure are described with respect to the following figures.

Figure 1A:
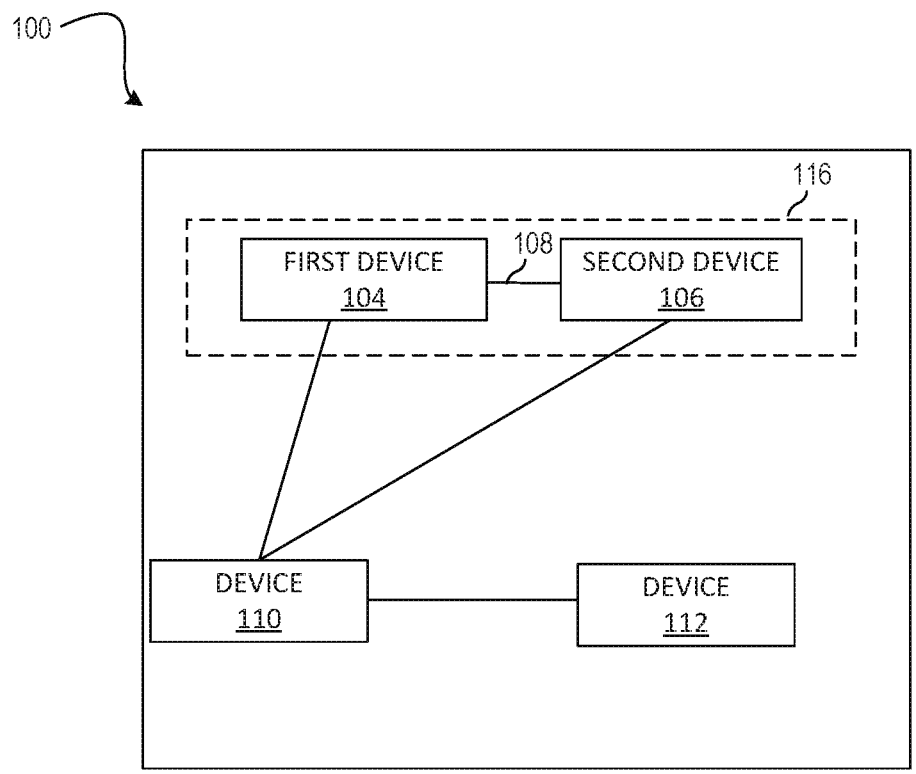
FIG. 1A is a block diagram of an example system for using BFD packets in a virtualized switch environment.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Bidirectional Forwarding Detection (BFD) is a network protocol that may be used to detect faults between two network devices acting as forwarding engines, such as network switches connected by a link. It provides detection of faults even on physical media that doesn't support failure detection of any kind, such as Ethernet, virtual circuits, tunnels and MPLS Label Switched Paths. A session may operate in one of two modes: asynchronous mode and demand mode. In asynchronous mode, both endpoints periodically send Hello packets to each other. If a number of those packets are not received, the session is considered down. There may be a variety of issues in using BFD in a virtualized network device environment.

A method for supporting BFD packets in a virtualized switch environment may include receiving, at a first linked network device, a bidirectional forwarding detection (BFD) packet originating from a first network device, wherein the first linked network device and a second linked network device are part of a link aggregation group running a BFD session and transmitting, from the first linked network device, a BFD synchronization packet to the second linked network device, wherein the link aggregation group uses an active forwarding mode where data traffic flowing through first linked network device is routed through the second linked network device. The method may include receiving, at the second linked network device, the BFD synchronization packet, wherein a time-to-live (TTL) value of the BFD synchronization packet is lower than a BFD TTL supported by the BFD session, determining, by the second linked network device, that the BFD synchronization packet is a BFD single-hop packet coming from a VLANs using the active forwarding mode and determining, by the second linked network device, not to discard the BFD synchronization packet.

FIG. 1A is a block diagram of an example system 100 where using BFD packets in a virtualized device environment may be useful.

The system 100 may include a first network device 104 and a second network device 106 connected by a link 108. The link 108 may be used to create a virtualized network device environment between the two devices. In one aspect, the link 108 may be part of an MCLAG topology. The system may also include a third network device 110 and a fourth network device 112.

Multi-Chassis Link Aggregation Group (MCLAG) is a type of LAG with constituent ports that terminate on separate chassis, primarily for the purpose of providing redundancy in the event one of the chassis fails. MCLAG may be used to create a virtual environment when a LAG is created between a pair of two network devices, such as network switches.

Network devices 110-112 may be any number of network devices, as described above. For example, devices 110-112 may be network switches. A network device may be a device within a network that forwards data sent by a sender device toward a recipient device (or multiple recipient devices). In some examples, a network device includes a layer 2 switch that forwards data packets (also referred to as data frames or data units) based on layer 2 addresses in the data packets. Examples of layer 2 addresses include Medium Access Control (MAC) addresses. In alternative examples, a switch includes a layer 3 router that forwards data packets based on layer 3 addresses, such as Internet Protocol (IP) addresses in the data packets.

A "packet" or "data packet" can refer to any unit of data that can be conveyed over a network. A packet or data packet may also refer to a frame or data frame, a data unit, a protocol data unit, and so forth.

A switch forwards data (in data packets) between a sender device and a recipient device (or multiple recipient devices) based on forwarding information (or equivalently, "routing information") accessible by the switch. The forwarding information can include entries that map network addresses (e.g., MAC addresses or IP addresses) and/or ports to respective network paths toward the recipient device(s).

The first network device 104 may be communicatively coupled to each of the network devices 110-112. Similarly, the second network device 106 may be communicatively coupled to each of the network devices 110-112. Link 108 and the various connections between first network device 104, the second network device 106 and the network devices 110-112 may be a physical link, such as an Ethernet connection or other physical connection, a wireless connection, a virtual connection, etc.

The combination of the first network device 104 and the second network device 106 may be presented to the user as a single virtualized network device 116. One of the network devices may be a primary network device and the other network device may be a peer device. In the event that the first network device 104 goes down, no traffic may be lost, although the total amount of bandwidth available to the system may be reduced. Moreover, this architecture provides the ability to configure one network device 104 and have the configuration synced to the network device 106. This keeps the network facing elements consistent across management changes to allow for load balancing and high availability in case of failure.

Moreover, the virtualization of the first network device 104 and the second network device 106 as a single virtualized device 116 may allow an LACP (Link Aggregation Control Protocol) group to span more than one network device. In MCLAG (Multi Chassis LAG) based virtualized deployments there are two independent control planes. If the MCLAG pair is connected-up a primary device via an MCLAG with any routing protocol running on top, the network devices may sync their Router-MAC entries between the devices involved so that data traffic can be directly forwarded without sending over an Inter-Switch Link (ISL).

Bidirectional Forwarding Detection (BFD) is a detection protocol that may be used to detect faults between two network devices acting as forwarding engines, such as network switches connected by a link. BFD may be used to provide fast forwarding path failure detection times for media types, encapsulations, topologies, and routing protocols. BFD can be used to detect forwarding path failures at a uniform rate, rather than the variable rates for different routing protocol hello mechanisms, making network profiling and planning easier and reconvergence time will be consistent and predictable. BFD may use control packets and echo packets to detect link failures.

In a virtualized environment, BFD is run for link failure detection when routing protocols are run between these devices. When the BFD Echo function is active, a stream of BFD Echo packets is transmitted in such a way as to have the other system loop them back through its forwarding path. If a number of packets of the echoed data stream are not received, the session is declared to be down. The key point is that the BFD echo leverages the fast/hardware forwarding path on the neighbor to get the echo packet returned to itself without waiting for an interrupt and special handling by the CPU. An echo packet is sent with the destination IP address as self IP address and destination Router-MAC address as the Router-MAC address of the peer to which BFD session is established.

A BFD session may operate in one of two modes: asynchronous mode and demand mode. In asynchronous mode, both endpoints periodically send Hello packets to each other. If a number of those packets are not received, the session is considered down. There may be a variety of issues in using BFD in a virtualized network device environment.

For example, a virtualized network device environment may use an active forwarding mode. In an active forwarding mode, some or all data packets received at one network device in the environment may be routed to other network devices in the environment. Routing is the process of transmitting the packets from one device to another on different L3 networks. In contrast, forwarding is the process of transmitting the packets between devices on the same L2/L3 network. However, routing a data packet may cause a hop counter to be altered.

A hop is one portion of the path between a source of data and its destination. As data packets are routed from their source to a destination, the data packet may pass through a variety of network devices. Each time packets are routed to the next network device, a hop occurs. As an example, in a virtualized network environment with two network devices in a LAG pair, if a first network device routes a data packet (such as a BFD packet) to the second network device in the LAG pair, one hop occurs. Accordingly, a Time-to-live (TTL) value, which measures the number of hops, may be decremented by one.

However, in a BFD environment, a BFD single-hop packet may be required to have a certain TTL or the packet will be dropped. In some aspects, BFD single hop packets are required to have a TTL of 255.

In one aspect, system 150 may implement BFD asynchronous traffic through software, such as, for example, at a control plane. This implementation may include transmitting Incoming BFD asynchronous traffic from the receiving device's forwarding plane over to its control plane. The control plane may process the packet and update its internal BFD session state, including establishing the session and updating the negotiated operating parameters). The control plane may then periodically send BFD asynchronous traffic packets to its forwarding plane and the forwarding plane will transmit the packet on the wire over to the peer.

In these aspects, system 150 may implement one of several techniques to support BFD in a virtualized device environment. A first technique may involve creating a networking tunnel between the virtualized devices, such as for example creating a networking tunnel between first device 104 and second device 106 (on top of 108). Tunneling is a process by which network communications are channeled between two devices. A link may be created between the two devices and data may be encapsulated at one device before sending to the other. Since traffic will travel within the tunnel, the TTL will remain unmodified and thus packets will not be discarded for having a TTL value that is less than required.

A second technique may be to use a ternary content-addressable memory (TCAM) at each device in the virtualized device environment. Specifically, the TCAM may be used to match single-hop BFD packets and adjust their TTL to a desired value. For example, a transferring device (such as second device 106) may route a BFD packet to a receiving device (such as first device 104). This packet routing would typically cause the transferring device to drop the TTL from 255 to 254 before routing. However, a TCAM at the transferring device (second device 106) may identify the BFD packet and the number of hops the packet took to the transferring device (second device 106) and will be taken to the receiving device (first device 104). Upon determining that one hop will be taken from the transferring device to the receiving device, the TCAM of the transferring device (second device 106) may prevent the TTL from being decremented from 255 to 254, thus causing the BFD packet to not be discarded when received at the receiving device (first device 104). In some aspects, the TTL may be decremented as usual, by the transferring device (second device 106) and the TCAM of the receiving device (first device 104) identify that the packet is a BFD packet and that one hop was taken and, as a result, may increment the TTL to 255.

A third technique may be to modify the BFD control plane daemon to support BFD single-hop packets with a TTL of a desired value when certain other criteria are met. For example, the BFD implementation on first device 104 may be modified to support a TTL of 254, when a packet comes via a link (i.e. 108) with another virtualized device in the virtualized device environment (i.e. second device 106) coming from VLANs where Active Forwarding mode is enabled. Advantageously, this technique may not require any additional hardware resources.

In another aspect system 150 may implement BFD asynchronous traffic through hardware, such as, for example, at a forwarding plane. Incoming BFD asynchronous traffic may be transmitted from the receiving device's forwarding plane ingress pipeline over to its Operations, Administration, and Maintenance processor (OAMP) which resides on the same forwarding plane. The OAMP may process the packet and update its internal BFD session state, including establishing the session and updating the negotiated operating parameters. The OAMP may periodically send BFD asynchronous traffic packets to its forwarding plane. The forwarding plane may transmit the packet on the wire over to the peer.

In these aspects, system 150 may implement one of several techniques to support BFD in a virtualized device environment. A first technique may involve creating a networking tunnel between the virtualized devices, such as for example creating a networking tunnel between first device 104 and second device 106. Tunneling is a process by which network communications are channeled between two devices. A link may be created between the two devices and data may be encapsulated at one device before sending to the other. Since traffic will travel within the tunnel, the TTL will remain unmodified and thus will not be discarded.

A second technique may be to use a ternary content-addressable memory (TCAM) at each device in the virtualized device environment. Specifically, the TCAM may be used to match single-hop BFD packets and adjust their TTL to a desired value. For example, a transferring device (such as second device 106) may route a BFD packet to a receiving device (such as first device 104). This packet routing would typically cause the transferring device to drop the TTL from 255 to 254 before routing. However, a TCAM at the transferring device (second device 106) may identify the BFD packet and the number of hops the packet took to the transferring device (second device 106) and will be taken to the receiving device (first device 104). Upon determining that one hop will be taken from the transferring device to the receiving device, the TCAM of the transferring device (second device 106) may prevent the TTL from being decremented from 255 to 254, thus causing the BFD packet to not be discarded when received at the receiving device (first device 104). In some aspects, the TTL may be decremented as usual, by the transferring device (second device 106) and the TCAM of the receiving device (first device 104) identify that the packet is a BFD packet and that one hop was taken and, as a result, may increment the TTL to 255.

Figure 1B:
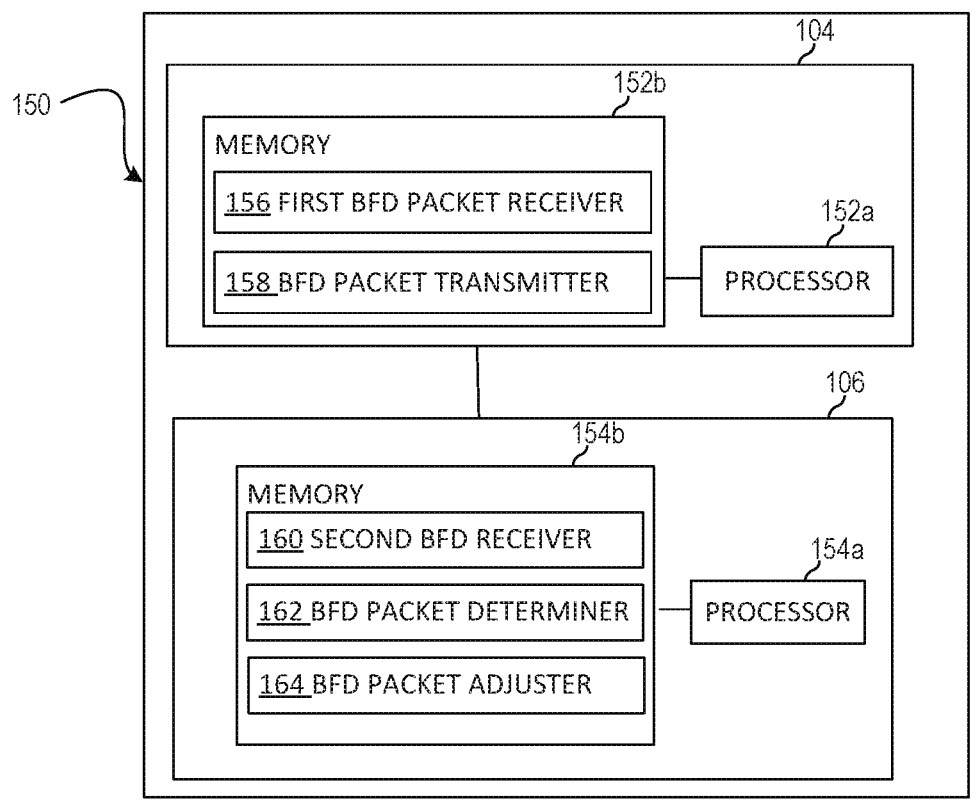
FIG. 1B is a block diagram of another example system for using BFD packets in a virtualized switch environment.

FIG. 1B is a block diagram of another example system 150 for using BFD packets in a virtualized device environment. Each network device in the virtualized environment may be configured to actively manage a network and/or to appear as a single virtual device in a management pane.

System 150 may include a first device 104 with a processor 152a and a memory 152b that may be coupled to each other through a communication link (e.g., a bus). System 150 may also include a second device 106 with a processor 154a and a memory 154b. Processor 152a and 154a may include a single or multiple Central Processing Units (CPU) or another suitable hardware processor(s). In some examples, memory 152b and 154b store machine readable instructions executed by processor 152a and 154a, respectively, for system 150. Memory 152b and 154b may include any suitable combination of volatile and/or non-volatile memory, such as combinations of Random Access Memory (RAM), Read-Only Memory (ROM), flash memory, and/or other suitable memory.

Memory 154a stores instructions to be executed by processor 154b including instructions for first BFD packet receiver 156, BFD packet transmitter 158 and/or other components. Memory 154b stores instructions to be executed by processor 154a including instructions for second BFD receiver 160, BFD packet determiner 162, BFD packet adjustor 162 and/or other components. According to various implementations, system 150 may be implemented in hardware and/or a combination of hardware and programming that configures hardware. Furthermore, in FIG. 1B and other Figures described herein, different numbers of components or entities than depicted may be used.

Processor 152a may execute first BFD packet receiver 156 to receive a bidirectional forwarding detection (BFD) packet originating from a first network device, wherein a first linked network device and a second linked network device are part of a link aggregation group running a BFD process. The BFD session may be run on top of the link aggregation group. The link aggregation group may implement asynchronous BFD traffic at a forwarding plane of one or more network devices.

The link aggregation group (between 110 and 104/106) may have a primary link to the first network device and a secondary link to the second network device. The primary link is between the first network device (110) and first linked network device of the link aggregation group (104) and the secondary link is between the first network device (110) and the second linked network device (106) of the link aggregation group.

Processor 152a may execute BFD packet transmitter 158 to transmit a BFD synchronization packet from a first linked network device (104), wherein the link aggregation group uses an active forwarding mode where data traffic flowing through first linked network device is routed through to second linked network device (106). Routed data to the second linked network device (106) as part of the active forwarding mode may include decrementing the TTL value by a particular value.

The particular value may be equivalent to the number of hops taken in the transmission of a packet. For example, if an initial TTL value is 255, after a one hop transmission, the value may be decreased by 1 to become 254.

Processor 154a may execute second BFD receiver 160 to receive the BFD synchronization packet at a second linked network device (106), wherein a time-to-live (TTL) value of the BFD synchronization packet is lower than a BFD TTL supported by the BFD process. Processor 154a may execute BFD packet determiner 162 that the BFD synchronization packet is a BFD single-hop packet coming from a VLANs using the active forwarding mode (108). In some aspects, the processor 154a may execute BFD packet determiner 162 to determine that the time-to-live (TTL) value of the BFD synchronization packet is an acceptable increment lower than a BFD TTL supported by the BFD process.

For example, a network device in a virtualized device environment may receive a BFD synchronization packet and determine that it came from a second network device part of the virtualized device environment, that the packet came via a one hop transmission and that the second network device was using the active forwarding mode.

Processor 154a may execute BFD packet adjustor 164 to adjust the time-to-live (TTL) value of the BFD synchronization packet to a BFD TTL supported by the BFD process.

In some aspects, processor 154*a* may execute a session establisher (not pictured) to establish a BFD session between the first network device and the link aggregation group.

For example, if the BFD packet was received and had a TTL value of 254, the TTL value may be adjusted to 255.

In some aspects, BFD packet determiner 162 and BFD packet adjustor 164 may be part of the second device 106. In these aspects, the processor 152*a* may execute BFD packet determiner 162 to determine that the time-to-live (TTL) value of the BFD synchronization packet is an acceptable increment lower than a BFD TTL supported by the BFD process.

Processor 152*a* may then execute BFD packet adjustor 164 to adjust the time-to-live (TTL) value. For example, if the BFD packet was supposed to be decremented from 254 to 255, the BFD packet adjustor 164 may be used to prevent the TTL value from being decremented.

Figure 2:
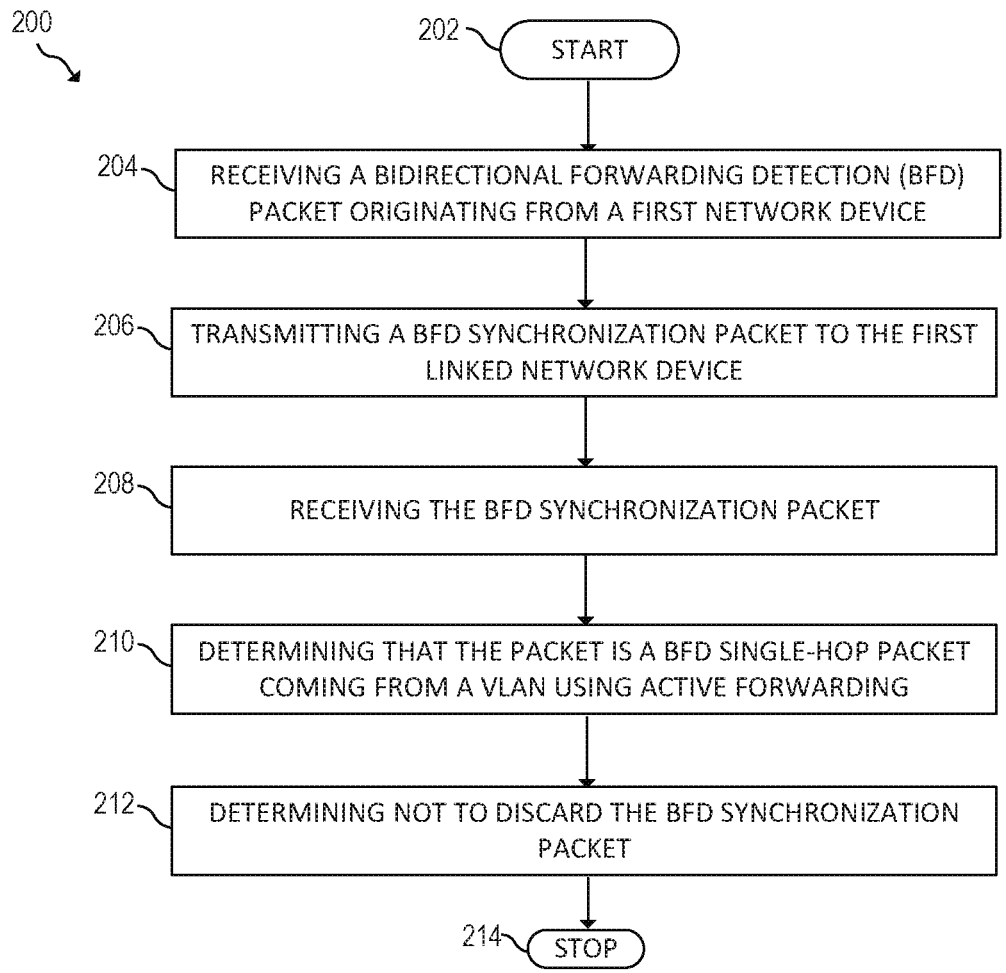
FIG. 2 is a flow diagram of an example method for transmitting BFD packets in a virtualized switch environment.

FIG. 2 is a flow diagram of a method 200 for using BFD packets in a virtualized device environment. The virtualized device deployment may have a similar topology to system 100 described above. Accordingly, parts of and/or the entire method may be performed by one or more of the devices 104, 106, 110 and 112 of system 100. Although the description of FIG. 2 may refer to system 100 and other elements of FIGS. 1A and 1B, this is for illustrative purposes only and the method described in FIG. 2 may be used in a variety of topologies.

The method 200 may begin at block 202 and proceed to block 204 where the method may include receiving, at a first linked network device, a bidirectional forwarding detection (BFD) packet originating from a first network device, wherein the first linked network device and a second linked network device are part of a link aggregation group running a BFD session. The BFD session may be run on top of the link aggregation group. The link aggregation group may implement asynchronous BFD traffic at a control plane of one or more network devices.

The link aggregation group has a primary link to the first network device and a secondary link to the second network device. The primary link is between the first network device and first linked network device of the link aggregation group and the secondary link is between the first network device and the second linked network device of the link aggregation group.

The method may proceed to block 206, where the method may include transmitting, from the first linked network device, a BFD synchronization packet to the second linked network device, wherein the link aggregation group uses an active forwarding mode where data traffic flowing through first linked network device is routed through the second linked network device. Routing data through the second linked network device as part of the active forwarding mode may include decrementing the TTL value by a particular value.

At block 208, where the method may include receiving, at the second linked network device, the BFD synchronization packet, wherein a time-to-live (TTL) value of the BFD synchronization packet is lower than a BFD TTL supported by the BFD session. In some aspects, the method may also include determining, by the second linked network device, that the time-to-live (TTL) value of the BFD synchronization packet is an acceptable increment lower than a BFD TTL supported by the BFD process.

At block 210, determining, by the second linked network device, that the BFD synchronization packet is a BFD single-hop packet coming from a VLANs using the active forwarding mode. In some aspects, the method may include establishing a BFD session between the first network device and the link aggregation group. At block 212, where the method may include determining, by the second linked network device, not to discard the BFD synchronization packet. The method may proceed to block 214, where the method may end.

Figure 3:
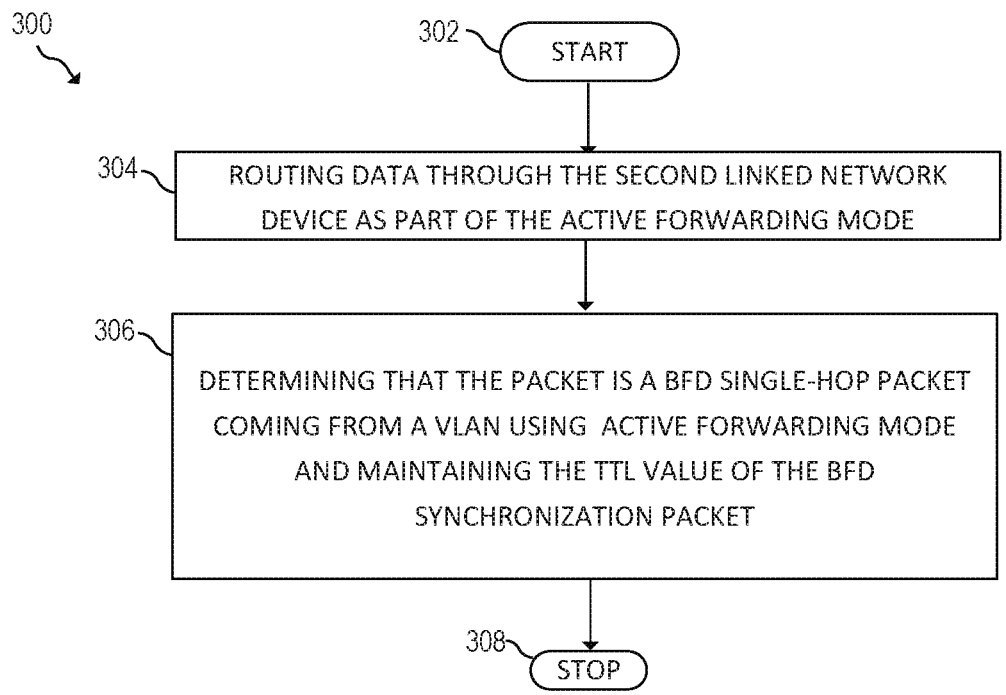
FIG. 3 is a block diagram of another example method for utilizing TTL packets in a BFD supported virtualized switch environment.

FIG. 3 is a flow diagram of a method 300 for an example method for using BFD packets in a virtualized device environment. The virtualized device deployment may have a similar topology to system 100 described above. Accordingly, parts of and/or the entire method may be performed by one or more of the devices 104, 106, 110 and 112 of system 100. Although the description of FIG. 2 may refer to system 100 and other elements of FIGS. 1A and 1B, this is for illustrative purposes only and the method described in FIG. 2 may be used in a variety of topologies.

The method may begin at block 302 and may proceed to block 304 where the method may include routing data through the second linked network device as part of the active forwarding mode. Routing the data may be performed as part of transmitting, from the first linked network device, a BFD synchronization packet to the second linked network device in a similar method to block 206 described above in reference to FIG. 2. At block 306, the method may include maintaining the TTL value of the BFD synchronization packet at 255. For example, in some aspects, a BFD single-hop sessions may require its packets to have a TTL of 255 and any other value should be dropped. As a result of the routing, the TTL of the BFD synchronization packet may be 254, as it went one hop from one member device of the virtualized device environment to a second device of the virtualized device environment. The method may proceed to block 308, where the method may end.

Figure 4:
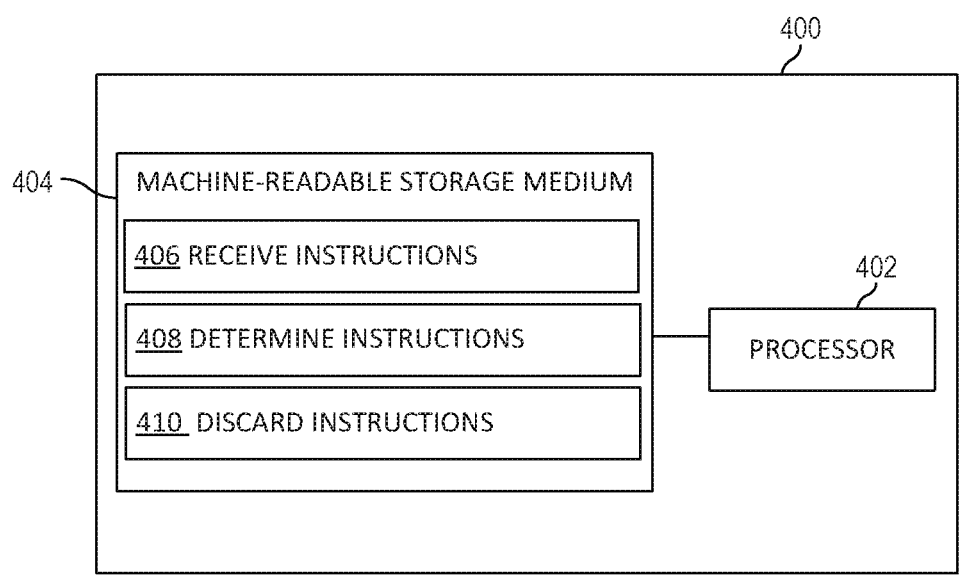
FIG. 4 is a block diagram of an example storage medium storing machine-readable instructions using BFD packets in a virtualized switch environment.

FIG. 4 is a block diagram of an example system 400 for using BFD packets in a virtualized device environment. Both the first and second network devices may be configured to actively manage a network and/or to appear as a single virtual device in a management pane.

In the example illustrated in FIG. 4, system 400 includes a processor 402 and a machine-readable storage medium 404. In some aspects, processor 402 and machine-readable storage medium 404 may be part of an Application-specific integrated circuit (ASIC). Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 402 may be at least one central processing unit (CPU), microprocessor, and/or other hardware devices suitable for retrieval and execution of instructions stored in machine-readable storage medium 404. In the example illustrated in FIG. 4, processor 402 may fetch, decode, and execute instructions 406, 408 and 410. Processor 402 may include at least one electronic circuit comprising a number of electronic components for performing the functionality of at least one of the instructions in machine-readable storage medium 404. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 404 may be any electronic, magnetic, optical, or other physical storage device that stores executable instructions. Thus, machine-readable storage medium 404 may be, for example, Random Access Memory (RAM), an Electrically-Erasable Programmable Read-Only Memory (EEPROM), a storage drive, an optical disc, and the like. Machine-readable storage medium 404 may be disposed within system 400, as shown in FIG. 4. In this situation, the executable instructions may be "installed" on the system 400. Machine-readable storage medium 404 may be a portable, external or remote storage medium, for example, that allows system 400 to download the instructions from the portable/external/remote storage medium. In this situation, the executable instructions may be part of an "installation package". As described herein, machine-readable storage medium 404 may be encoded with executable instructions for context aware data backup. The machine-readable storage medium may be non-transitory.

Referring to FIG. 4, receive instructions 406, when executed by a processor (e.g., 602), may cause system 400 to receive, at a second network device, a bidirectional forwarding detection (BFD) packet from a first linked network device, wherein the first linked network device and a second linked network device are part of a link aggregation group running a BFD process the link aggregation group uses an active forwarding mode where data traffic flowing through first linked network device is routed through the second linked network device. Routing data through the second linked network device as part of the active forwarding mode may include decrementing the TTL value by a particular value.

In some aspects, the BFD session may be run on top of the link aggregation group. In some aspects, the link aggregation group implements asynchronous BFD traffic at a control plane of one or more network devices. In some aspects, the link aggregation group has a primary link is between the first network device and first linked network device of the link aggregation group and a secondary link between the first network device and the second linked network device of the link aggregation group.

Determine instructions 408, when executed by a processor (e.g., 402), may cause system 400 to determine, at the second network device, that the BFD synchronization packet is a BFD single-hop packet coming from a VLANs using the active forwarding mode and a time-to-live (TTL) value of the BFD synchronization packet is an acceptable increment lower than a BFD TTL supported by the BFD process. In some aspects, determine instructions 408, when executed by a processor (e.g., 402), may cause system 400 to determine, by the second linked network device, that the time-to-live (TTL) value of the BFD synchronization packet is an acceptable increment lower than a BFD TTL supported by the BFD process Discard instructions 410, when executed by a processor (e.g., 402), may cause system 400 to determine, at the second network device, not to discard the BFD synchronization packet. In some aspects, machine-readable storage medium 404 may also include discard instructions, when executed by a processor (e.g., 402), may cause system 400 to establish a BFD session between the first network device and the link aggregation group.

The foregoing disclosure describes a number of examples for using BFD packets in a virtualized device environment. The disclosed examples may include systems, devices, computer-readable storage media, and methods for using BFD packets in a virtualized device environment. For purposes of explanation, certain examples are described with reference to the components illustrated in FIGS. 1A-4. The content type of the illustrated components may overlap, however, and may be present in a fewer or greater number of elements and components. Further, all or part of the content type of illustrated elements may co-exist or be distributed among several geographically dispersed locations. Further, the disclosed examples may be implemented in various environments and are not limited to the illustrated examples.

Further, the sequence of operations described in connection with FIGS. 1A-4 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A method comprising:
receiving, at a first linked network device, a bidirectional forwarding detection (BFD) packet originating from a first network device, wherein the first linked network device and a second linked network device are part of a link aggregation group running a BFD session;
transmitting, from the first linked network device, a BFD synchronization packet to the second linked network device, wherein the link aggregation group uses an active forwarding mode where data traffic flowing through first linked network device is routed through the second linked network device;
receiving, at the second linked network device, the BFD synchronization packet, wherein a time-to-live (TTL) value of the BFD synchronization packet is lower than a BFD TTL supported by the BFD session;
determining, by the second linked network device, that the BFD synchronization packet is a BFD single-hop packet coming from a VLANs using the active forwarding mode; and
determining, by the second linked network device, not to discard the BFD synchronization packet.

2. The method of claim 1 comprising:
determining, by the second linked network device, that the time-to-live (TTL) value of the BFD synchronization packet is an acceptable increment lower than a BFD TTL supported by the BFD process.

3. The method of claim 1, wherein the BFD session is run on top of the link aggregation group.

4. The method of claim 1, wherein routing data through the second linked network device as part of the active forwarding mode includes decrementing the TTL value by a particular value.

5. The method of claim 1 comprising:
establishing a BFD session between the first network device and the link aggregation group.

6. The method of claim 1, wherein the link aggregation group implements asynchronous BFD traffic at a control plane of one or more network devices.

7. The method of claim 1, wherein the link aggregation group has a primary link to the first network device and a secondary link to the first network device.

8. The method of claim 7, wherein the primary link is between the first network device and first linked network device of the link aggregation group and the secondary link is between the first network device and the second linked network device of the link aggregation group.

9. A non-transitory computer-readable storage medium encoded with instructions, the instructions executable by a processor of a system to cause the system to:

receive, at a second linked network device, a bidirectional forwarding detection (BFD) synchronization packet from a first linked network device, wherein the first linked network device and the second linked network device are part of a link aggregation group running a BFD process and wherein the link aggregation group uses an active forwarding mode where data traffic flowing through first linked network device is routed through the second linked network device;

determine, at the second linked network device, that the BFD synchronization packet is a BFD single-hop packet coming from a VLANs using the active forwarding mode and a time-to-live (TTL) value of the BFD synchronization packet is an acceptable increment lower than a BFD TTL supported by the BFD process; and determine, at the second linked network device, not to discard the BFD synchronization packet.

10. The non-transitory computer-readable storage medium of claim 9, the instructions executable by a processor of a system to cause the system to:

determine, by the second linked network device, that the time-to-live (TTL) value of the BFD synchronization packet is an acceptable increment lower than a BFD TTL supported by the BFD process.

11. The non-transitory computer-readable storage medium of claim 9, wherein the BFD session is run on top of the link aggregation group.

12. The non-transitory computer-readable storage medium of claim 9, wherein routing data through the second linked network device as part of the active forwarding mode includes decrementing the TTL value by a particular value.

13. The non-transitory computer-readable storage medium of claim 9, wherein the link aggregation group implements asynchronous BFD traffic at a control plane of one or more network devices.

14. The non-transitory computer-readable storage medium of claim 9, wherein the link aggregation group has a primary link is between the first network device and first linked network device of the link aggregation group and a secondary link between the first network device and the second linked network device of the link aggregation group.

15. A system comprising:
a first BFD packet receiver to receive a bidirectional forwarding detection (BFD) packet originating from a first network device, wherein a first linked network device and a second linked network device are part of a link aggregation group running a BFD process;
a BFD packet transmitter to transmit a BFD synchronization packet from the first linked network device, wherein the link aggregation group uses an active forwarding mode where data traffic flowing through first linked network device is routed through the second linked network device;
a second BFD receiver to receive the BFD synchronization packet at the second linked network device, wherein a time-to-live (TTL) value of the BFD synchronization packet is lower than a BFD TTL supported by the BFD process;
a BFD packet determiner that the BFD synchronization packet is a BFD single-hop packet coming from a VLANs using the active forwarding mode; and
a BFD packet adjuster to adjust the time-to-live (TTL) value of the BFD synchronization packet to a BFD TTL supported by the BFD process.

16. The system of claim 15 comprising:
the BFD packet determiner to determine that the time-to-live (TTL) value of the BFD synchronization packet is an acceptable increment lower than a BFD TTL supported by the BFD process.

17. The system of claim 15, wherein the BFD session is run on top of the link aggregation group.

18. The system of claim 15, wherein routing data through the second linked network device as part of the active forwarding mode includes decrementing the TTL value by a particular value.

19. The system of claim 15, wherein the link aggregation group implements asynchronous BFD traffic at a forwarding plane of one or more network devices.

20. The system of claim 15, wherein the primary link is between the first network device and first linked network device of the link aggregation group and the secondary link is between the first network device and the second linked network device of the link aggregation group.

* * * * *